United States Patent
Moon et al.

(10) Patent No.: US 9,497,587 B2
(45) Date of Patent: *Nov. 15, 2016

(54) METHOD AND APPARATUS FOR PROVIDING INTERNET SERVICE BASED ON USER'S LOCATION INFORMATION IN A COMMUNICATION SYSTEM

(71) Applicant: Samsung Electronics Co., Ltd., Gyeonggi-do (KR)

(72) Inventors: Sang-Jun Moon, Gyeonggi-do (KR); Sung-Won Lee, Gyeonggi-do (KR); Dong-Keon Kong, Gyeonggi-do (KR); Dae-Seok Kim, Seoul (KR); Young-Ky Kim, Seoul (KR); Joon-Ho Park, Gyeonggi-do (KR); Poong-Ki Min, Seoul (KR); Hyeon-Jin Kang, Seoul (KR); Ji-Hye Ha, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/338,028

(22) Filed: Jul. 22, 2014

(65) Prior Publication Data

US 2014/0335898 A1 Nov. 13, 2014

Related U.S. Application Data

(63) Continuation of application No. 11/865,486, filed on Oct. 1, 2007, now Pat. No. 8,787,937.

(30) Foreign Application Priority Data

Sep. 30, 2006 (KR) .......................... 10-2006-0096690
Apr. 27, 2007 (KR) .......................... 10-2007-0041640

(51) Int. Cl.
*H04W 4/02* (2009.01)
*H04M 11/04* (2006.01)
*H04L 12/14* (2006.01)

(52) U.S. Cl.
CPC ............... *H04W 4/02* (2013.01); *H04L 12/14* (2013.01); *H04M 11/04* (2013.01)

(58) Field of Classification Search
CPC ....... G06F 17/30; H04W 4/02; H04W 48/16; H04W 48/10; H04W 60/04; H04W 64/003; H04W 84/045; H04W 48/02; H04W 4/06; H04W 4/021; H04W 64/00; H04L 12/14; H04J 11/0069
USPC ............ 455/433–435, 456–457, 452, 414.2, 455/405; 701/200; 709/218; 379/219, 379/114.03
See application file for complete search history.

(56) References Cited

U.S. PATENT DOCUMENTS 6,169,899 B1 1/2001 Havinis et al.
6,259,923 B1 7/2001 Lim et al.
(Continued)

FOREIGN PATENT DOCUMENTS

EP 1372309 12/2003
KR 1020030080526 10/2003
(Continued)

*Primary Examiner* — Nizar Sivji
(74) *Attorney, Agent, or Firm* — The Farrell Law Firm, P.C.

(57) ABSTRACT

Methods and apparatuses are provided for providing an internet service by a server in a communication system. A user interface for selecting whether to provide a search service based on location information of a subscriber station, is provided to the subscriber station. If the subscriber station selects to be provided the search service based on the location information, the location information of the subscriber station is acquired using a location information server or a cell identifier (ID) according to an existence of the location information server in the communication system. Data is sought based on the location information. The data is provided to the subscriber station.

20 Claims, 12 Drawing Sheets

(56) References Cited

U.S. PATENT DOCUMENTS

| | | | |
|---|---|---|---|
| 7,565,157 B1 * | 7/2009 | Ortega | H04W 4/02 455/414.3 |
| 7,945,546 B2 | 5/2011 | Bliss et al. | |
| 8,208,948 B2 | 6/2012 | Kim et al. | |
| 2002/0077897 A1 | 6/2002 | Zellner et al. | |
| 2003/0187949 A1 | 10/2003 | Bhatt et al. | |
| 2004/0127252 A1 | 7/2004 | Tsunomoto et al. | |
| 2005/0065916 A1 | 3/2005 | Ge et al. | |
| 2005/0255853 A1 | 11/2005 | Ewert et al. | |
| 2005/0261001 A1 | 11/2005 | Marley et al. | |
| 2006/0058942 A1 | 3/2006 | Lee | |
| 2006/0085392 A1 | 4/2006 | Wang et al. | |
| 2006/0253494 A1 | 11/2006 | Kang et al. | |
| 2007/0204027 A1 | 8/2007 | Shih et al. | |
| 2008/0080402 A1 | 4/2008 | Chang et al. | |
| 2008/0090592 A1 | 4/2008 | Tsuchiya | |
| 2008/0104201 A1 | 5/2008 | Moon et al. | |
| 2008/0139244 A1 | 6/2008 | Vau et al. | |
| 2008/0153517 A1 | 6/2008 | Lee | |
| 2014/0112328 A1 * | 4/2014 | Wang | 370/338 |
| 2015/0111546 A1 * | 4/2015 | Jessup | G06F 17/3087 455/414.1 |

FOREIGN PATENT DOCUMENTS

| | | |
|---|---|---|
| KR | 1020040094235 | 11/2004 |
| KR | 1020050066880 | 6/2005 |
| KR | 1020060113135 | 11/2006 |
| KR | 1020080030375 | 4/2008 |

* cited by examiner

METHOD AND APPARATUS FOR PROVIDING INTERNET SERVICE BASED ON USER'S LOCATION INFORMATION IN A COMMUNICATION SYSTEM

PRIORITY

This application is a Continuation Application of U.S. application Ser. No. 11/865,486, filed on Oct. 1, 2007, now U.S. Pat. No. 8,787,937, issued on Jul. 22, 2014, which claims priority under 35 U.S.C. §119(a) to a Korean Patent Application filed in the Korean Intellectual Property Office on Sep. 30, 2006 and assigned Serial No. 2006-96690 and a Korean Patent Application filed in the Korean Intellectual Property Office on Apr. 27, 2007 and assigned Serial No. 2007-41640, the contents of which are incorporated herein by reference.

BACKGROUND OF THE INVENTION

1. Field of the Invention

The present invention relates generally to a method and apparatus for providing Internet services based on user's location information in a communication system.

2. Description of the Related Art

The communication system has location information of a corresponding user, which is provided using information on a base station of a cell accessed by a subscriber station or using a location information server.

FIG. 1 illustrates a conventional wireless communication system.

Referring to FIG. 1, the conventional wireless communication system roughly includes a communication system 100, the Internet 120, an Internet service provider 130 and a subscriber station 140.

The communication system 100 includes a Location Information Server (LIS) server 102, a device capability server 104, a user profile server 106, a Quality of Service (QoS) Server 108 and a billing server 110.

The communication system 100 acquires location information of the corresponding users using the LIS server 102. The other elements except for the LIS server 102 are not closely related to the present invention, so a detailed description thereof will be omitted herein for the sake of conciseness.

In addition, the communication system 100 provides an Internet Protocol (IP) connection to the corresponding subscriber station 140 via a Radio Access Station (RAS) 112 in charge of connecting a physical air section, an Access Service Network Gate Way (ASN GW) 114 in charge of a Medium Access Control (MAC) section of an access network, and a Connectivity Service Network (CSN) 116 in charge of making a connection up to a network layer. Herein, the RAS 112 corresponds to a Base Station (BS) of the cellular communication system, the ASN GW 114 corresponds to a Base Station Controller (BSC) and a Serving GPRS Supporting Node (SGSN) of the cellular communication system, and the CSN 116 corresponds to a Packet Data Service Node (PDSN) and a Gateway GPRS Support Node (GGSN) of the cellular communication system.

The subscriber station 140 can be any type of terminal including, for example, a Personal Computer (PC), a Personal Digital Assistants (PDA), a Portable Multimedia player (PMP) and a digital camera.

The Internet service provider 130 includes an Internet Protocol Television (IPTV) server (132) for providing Internet-based television programs to the subscriber station 140 via the Internet 120 connected thereto, a music/video streaming server 134 for providing music/video streaming services for transmitting/receiving music and video data in realtime, a search server 136 for searching for the information required by the subscriber station 140, an advertising server 138 for providing advertisements and an other service server 139 for providing other services.

The Internet service provider 130 is connected to the corresponding subscriber station 140 via the Internet 120 using the IP connection provided by the CSN 116 of the communication system 100, and provides various Internet services, such as search, IPTV and Streaming services, to the subscriber station 140 via the servers 132 to 139 that provide the various services previously described.

FIG. 2 illustrates a conventional method for providing an Internet service by an Internet service provider. It is assumed herein that a subscriber station now located in New York searches for a pizza shop using the search service.

Referring to FIG. 2, the Internet service provider includes a search server 200 for providing the search service required by service users, the Internet 210 via which the service users can access the search service, a wireless communication network 220 in which the service users are located, and a user interface 230 with which the service users can input a search request to the search server 200.

If the service user inputs 'pizza' to the search item in the user interface 230, the wireless communication network 220 sends a search request for 'pizza' to the search server 200 (see 202).

Upon receipt of the search request, the search server 200 makes a search for the search item 'pizza', and then sends the corresponding search result 235 to the service user (see 204).

It is assumed herein that the service user now uses the wireless communication network 220 in New York. However, because the Internet service provider, providing the search service using the search server 200, cannot acquire location information of the corresponding service user, it may provide the service user with the search result 235 including the searched pizza shops only in its searchable areas, for example, Dallas, Las Vegas or San Jose, regardless of the location of the service user.

As described above, in the conventional configuration where the Internet service is provided, the corresponding user receives not only its necessary information but also unnecessary information, causing a delay in the search time and causing a load due to the unnecessary information.

SUMMARY OF THE INVENTION

An aspect of the present invention is to address at least the foregoing problems and/or disadvantages and to provide at least the advantages described below. Accordingly, an aspect of the present invention is to provide a method and apparatus for providing an efficient Internet service using location information of a user in a communication system.

An aspect of the present invention is to provide a method and apparatus for providing a service interface with which an Internet service provider can use location information of a user.

An aspect of the present invention is to provide a method and apparatus in which a network accessed by a subscriber station provides an Internet service in a communication system.

According to the present invention, a method is provided for providing an Internet service by a server in a communication system. A user interface for selecting whether to provide a search service based on location information of a subscriber station, is provided to the subscriber station. If the subscriber station selects to be provided the search service based on the location information, the location information of the subscriber station is acquired using a location information server or a cell identifier (ID) according to an existence of the location information server in the communication system. Data is sought based on the location information. The data is provided to the subscriber station.

According to the present invention, an apparatus is provided for providing an Internet service in a communication system. The apparatus includes a controller for providing, to a subscriber station, a user interface for selecting whether to provide a search service based on location information of the subscriber station. If the subscriber station selects to be provided the search service based on the location information, the controller acquires the location information of the subscriber station using a location information server or a cell ID according to an existence of the location information server in the communication system, and searches data based on the location information. The apparatus also includes a transceiver for providing the data to the subscriber station by controlling the controller.

According to the present invention, a method is provided for using an internet service by a subscriber station in a communication system. A search service is selected through a user interface for selecting whether to provide the search service based on location information of the subscriber station. A search request is input to a server. Data corresponding to the search request is received, from the server, based on the location information. The location information is acquired using a location information server or a cell ID according to an existence of the location information server in the communication system.

According to the present invention, an apparatus is provided for using an internet service in a communication system. The apparatus includes a controller for selecting a search service through a user interface for selecting whether to provide the search service based on location information of the subscriber station, and inputting a search request to a server. The apparatus also includes a transceiver for receiving, from the server, data corresponding to the search request based on the location information. The location information is acquired using a location information server or a cell ID according to an existence of the location information server in the communication system.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
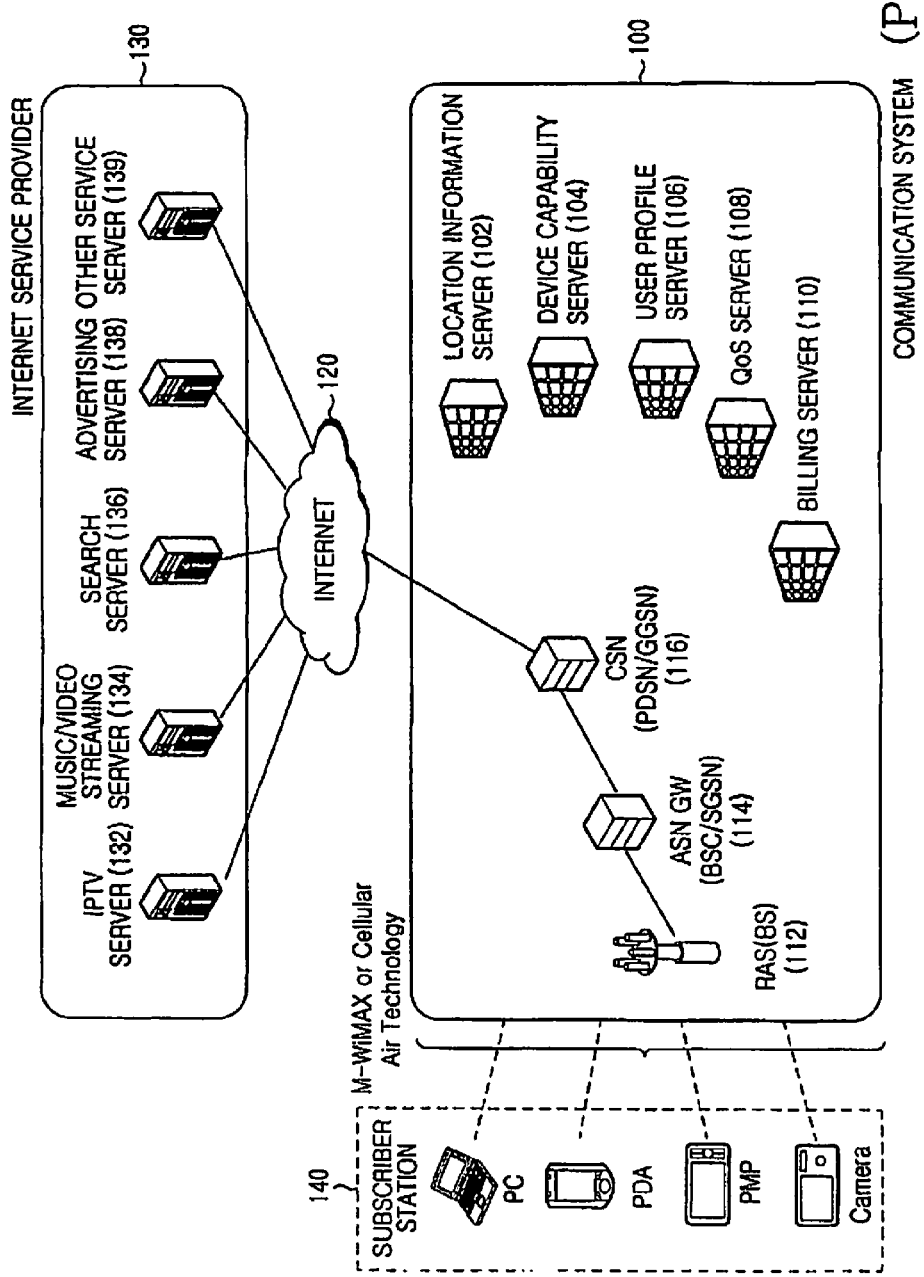
FIG. 1 illustrates a conventional wireless communication system.
Figure 2:
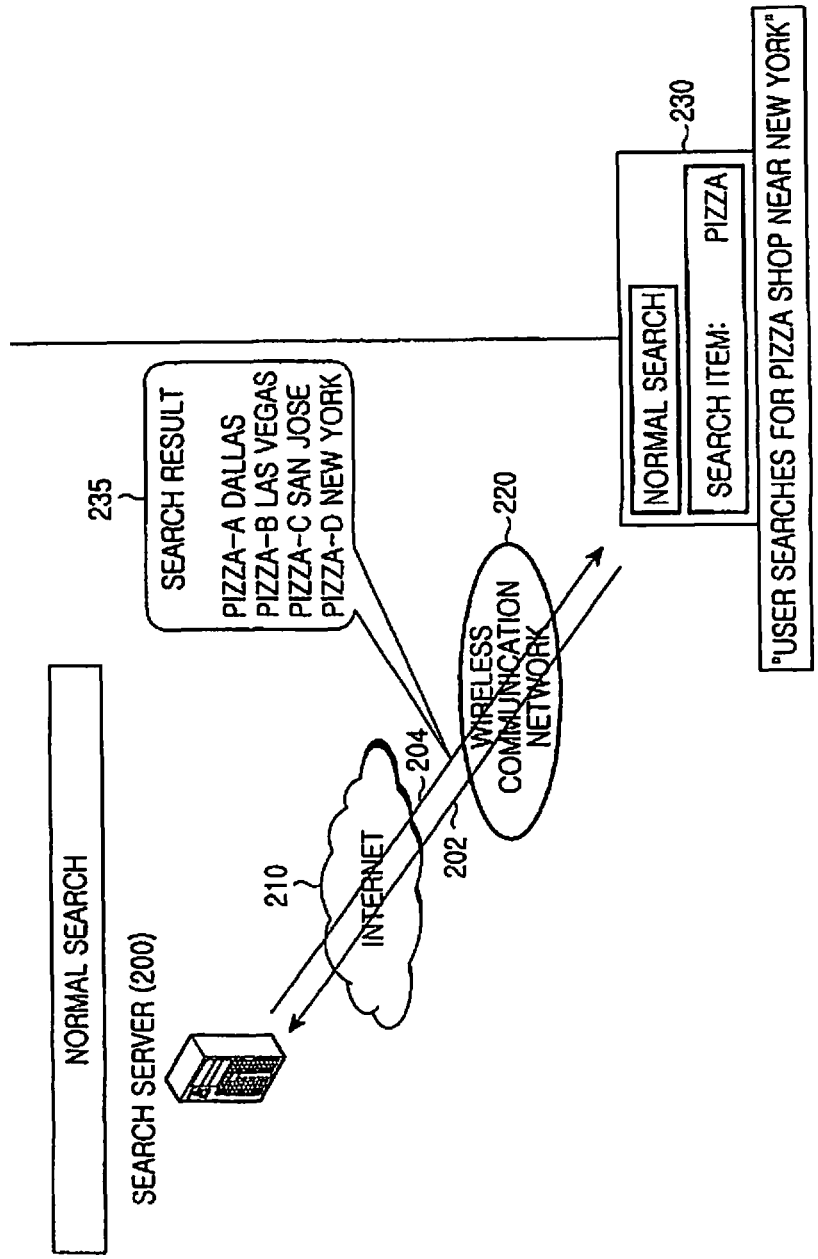
FIG. 2 illustrates a conventional method for providing an Internet service by an Internet service provider.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for the sake of clarity and conciseness.

The present invention provides a method and apparatus for providing an Internet service based on user's location information in a wireless communication system.

Figure 3:
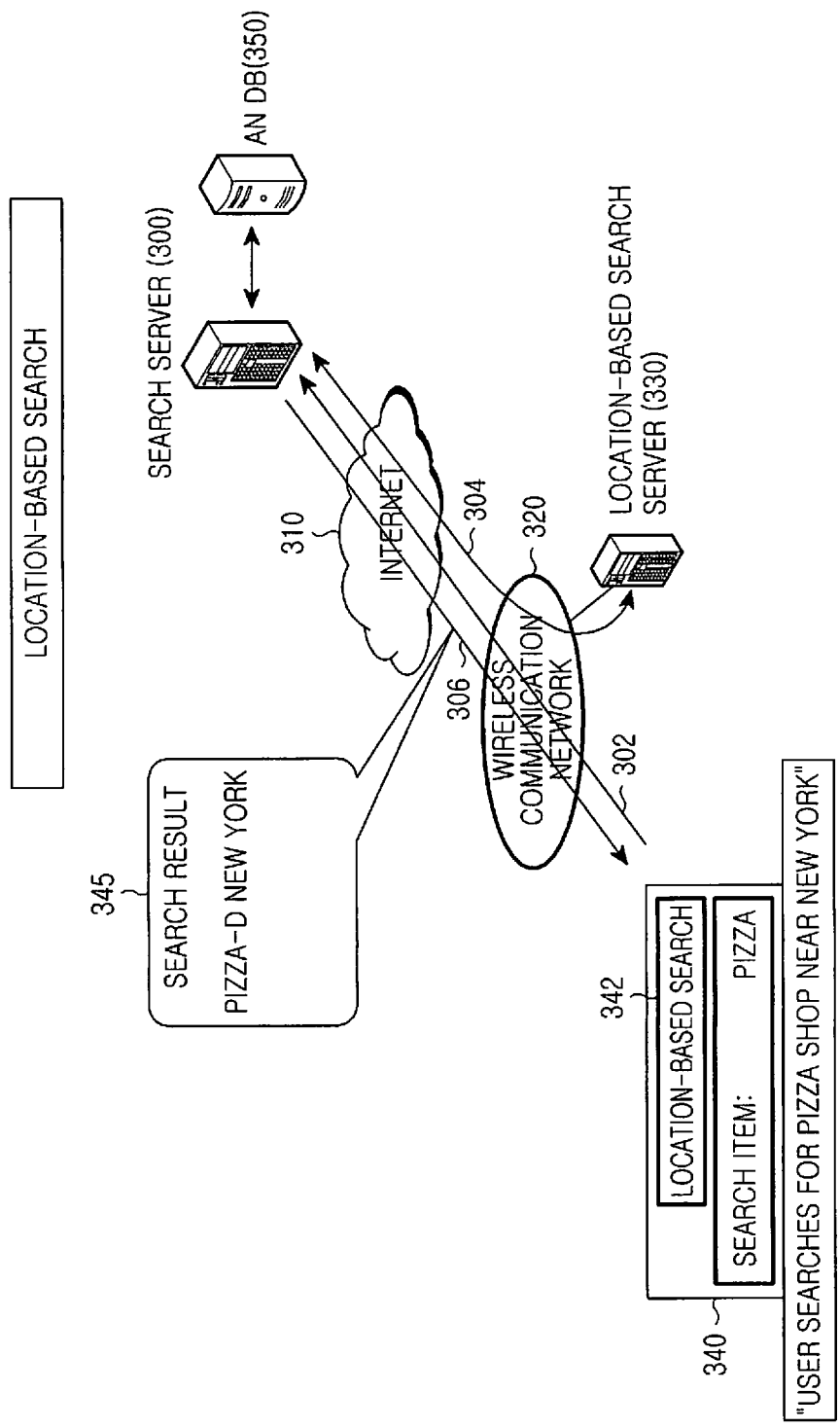
FIG. 3 illustrates a method for providing an Internet service using user's location information in a wireless communication system according to the present invention.

FIG. 3 illustrates a method for providing an Internet service using user's location information in a wireless communication system according to the present invention.

Referring to FIG. 3, the wireless communication system includes a search server 300 for providing a search service and determining whether a user's access network supports a Universal Service Interface (USI) 340, the Internet 310, a wireless communication network 320 and an Access Network Database (AN DB) 350 connected to the search server 300. The user interface 340, including a location-based search option box 342, can allow the user to select at least one of a normal search for providing the existing search method, and a location information-based search for providing a search based on location information of the user. Herein, the search server 300 determines whether the user's access network can support the USI by making reference to the AN DB 350, and determines whether to provide the location-based option box, or location-based interface, according to the determination result.

If the service user checks the location-based search option box 342 in the user interface 340 and inputs 'pizza' to the search item to request a search for it, the wireless communication network 320 forwards the request of the service user to the search server 300 (see 302).

Upon receipt of the search request, the search server 300 sends a request for location information of the user to a location-based search server 330 of the wireless communication network 320, and receives the location information of the user there from (see 304).

Upon acquiring the information indicating that the location of the user is New York, the search server 300 makes a search for pizza shops located in New York, and then sends the corresponding search result 345 including the pizza shops located in New York, to the subscriber station (see 306).

However, if the network accessed by the subscriber station cannot support the USI, the subscriber station (or terminal) can use only the existing normal search method, i.e. the search method in which the location-based search option box 342 is not displayed or inactivated. In the method for acquiring the user's location information, the search server 300 acquires the user's location information using the location-based search server 330 in the wireless communication network 320. However, in an alternative method for acquiring location information of the service user, the search server 300 can previously collect the location information frequently search-requested by the corresponding service user by pursuing the usual search history of the service user, or can acquire the recently accessed cell IDentifiers (IDs) by re-paging the corresponding subscriber station.

That is, based on the user's location information, the corresponding user can search for only the necessary information that the user can directly use.

Figure 4:
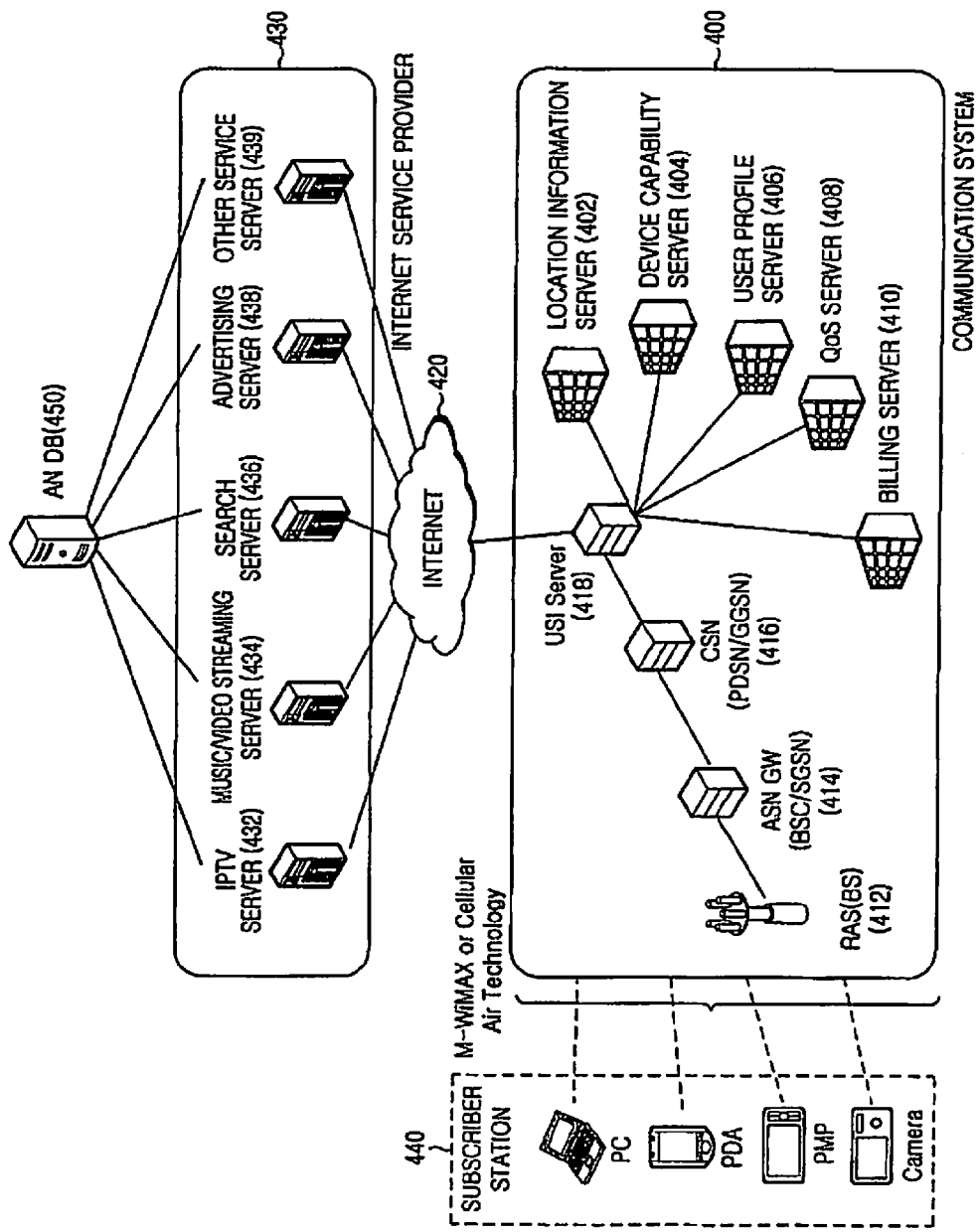
FIG. 4 illustrates a configuration of a wireless communication system according to the present invention.

FIG. 4 illustrates a configuration of a wireless communication system according to the present invention.

Referring to FIG. 4, a wireless communication system roughly includes an Internet service provider 430 for providing Internet services such as search and advertisement services, and the Internet 420 via which the service user can access the Internet services. Herein, the communication system 400 and the Internet service provider 430 can determine whether the network accessed by the user, or the terminal, can support a USI, in association with an AN DB 450 that stores the information indicating whether the network accessed by the terminal can support the USI.

The communication system 400 includes a location information server 402, a device capability server 404, a user profile server 406, a Quality of Service (QoS) Server 408, a billing server 410 and a USI server 418.

The communication system 400 provides an IP connection to a corresponding subscriber station 440 via a Radio Access Station (RAS) 412 for connecting a physical air section, an ASN GW 414 for a Medium Access Control (MAC) connection of an access network, and a Circuit Switched Network (CSN) 416 for making a connection up to a network layer. Herein, the RAS 412 corresponds to a base station of the cellular communication system, the ASN GW 414 corresponds to a Base Station Controller (BSC) and a Serving GPRS Supporting Node (SGSN) of the cellular communication system, and the CSN 416 corresponds to a Packet Data Serving Node (PDSN) and a Gateway GPRS Serving Node (GGSN) of the cellular communication system. The ASN GW 414 stores information on the cell ID, last accessed by the subscriber station 440.

The Internet service provider 430 includes an Internet Protocol Television (IPTV) server 432 for providing Internet-based television programs to the subscriber station 440 via the Internet 420 connected thereto, a music/video streaming server 434 for providing music/video streaming services for transmitting/receiving music and video data in realtime, a search server 436 for searching for the information required by the subscriber station 440, an advertising server 438 for providing advertisements, and an other service server 439 for providing other services.

The Internet service provider 430 is connected to the corresponding subscriber station 440 via the Internet 420 using the IP connection provided by the CSN 416 of the communication system 400, and provides various Internet services, such as search, IPTV and Streaming services, to the subscriber station 440 via the servers 432 to 439 that provide the various services previously described. Herein, the subscriber station 440 can be any type of terminal including a Personal Computer (PC), a Personal Digital Assistant (PDA), a Portable Multimedia Player (PMP) and a digital camera.

The communication system 400 acquires location information of the corresponding users by means of the location information server 402. The other elements except for the location information server 402 are not closely related to the present invention, so a detailed description thereof will be omitted herein for the sake of conciseness.

The USI server 418 provides a user interface so that the Internet service provider 430 can use location information of the corresponding subscriber station 440, provided from the location information server 402. A detailed description of the user interface will be made with reference to FIGS. 5A and 5B.

Upon receipt of a request for location information of a particular user from the Internet service provider 430, the USI server 418 searches for location information of the corresponding user in response to the request, and sends the searched location information to the Internet service provider 430. Thereafter, the Internet service provider 430 performs such services as search or advertisement based on the received user's location information, thereby providing an efficient service to the user.

Although the Internet service provider 430 herein acquires the user's location information from the location information server 402 via the USI server 418, by way of example, it can also acquire the user's location information in other alternative methods.

Figure 5A:
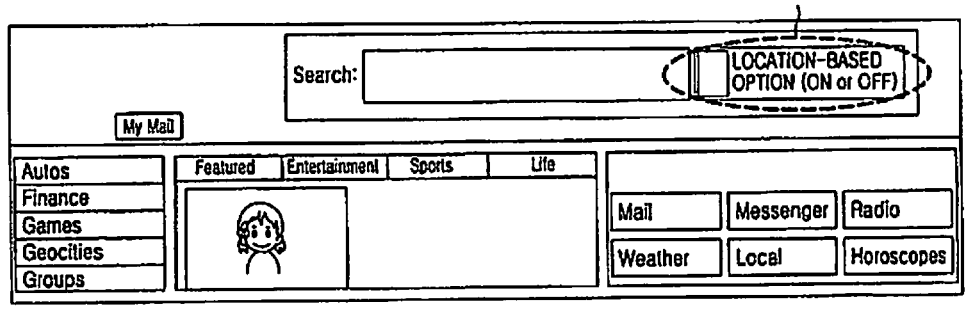
FIGS. 5A and 5B illustrate a user interface according to a first embodiment of the present invention.
Figure 5B:
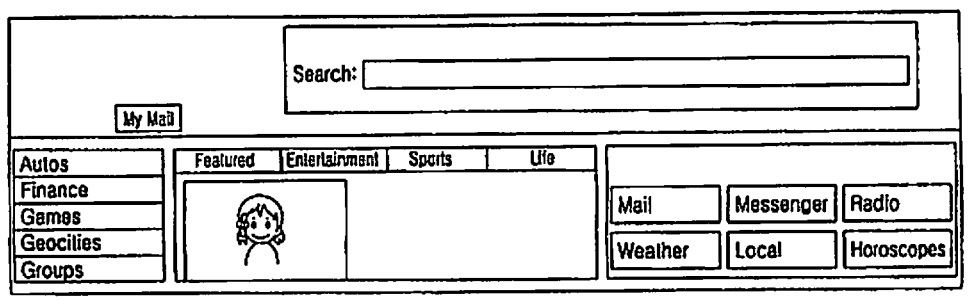

FIGS. 5A and 5B illustrate a user interface according to a first embodiment of the present invention.

Referring to FIG. 5A, when the network accessed by a subscriber station can support a USI, an Internet service provider can provide to the subscriber station an option box 500 with which it can make a selection as to whether it will provide the search service using the user's location information of the communication system.

That is, if the subscriber station selects the location-based option, the Internet service provider acquires location information of the subscriber station from the location information server 402 of the communication system 400 via the USI server 418, as for the information search-requested by the subscriber station, and performs a search based on the location information. Aside from the acquired information, the information indicating the current location address of the subscriber station and whether the subscriber station can support the USI can be displayed through a separate window or information bar.

However, if the subscriber station does not select the location-based option, the Internet service provider performs the search without using the location information of the subscriber station, as for the information search-requested by the user, in the conventional manner.

Referring to FIG. 5B, when the network accessed by the subscriber station cannot support the USI, the Internet service provider provides the search service with no location-based search option box, or an inactivated search service, to the subscriber station.

The first embodiment of the present invention provides a search service that uses, as location information of the terminal, a cell ID last accessed by the subscriber station that has made a request for the search service, provided from an ASN GW of the communication system, and is based on the cell ID, when the communication system has no separate location information server.

Figure 6A:
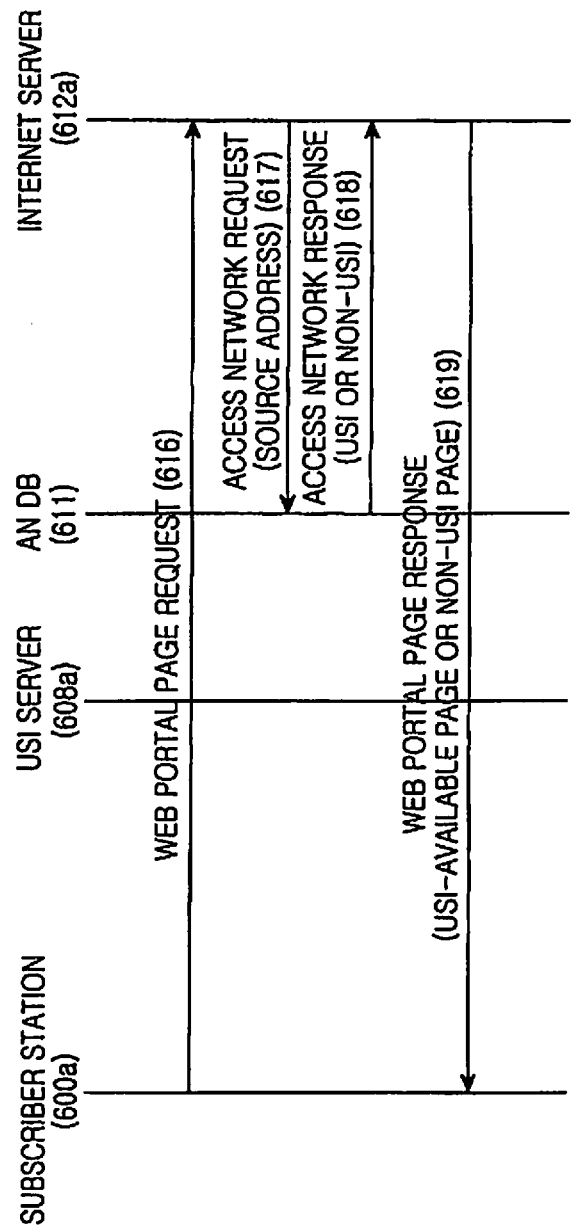
FIGS. 6A and 6B illustrates a method for providing an Internet service based on user's location information depending on whether a network accessed by a subscriber station can support a USI according to a first embodiment of the present invention.

FIG. 6A illustrates a method for providing a service interface according to whether a network accessed by a subscriber station can support a USI according to the first embodiment of the present invention.

Referring to FIG. 6A, in step 616, a subscriber station 600a sends a request for a web portal page to an Internet server 612a, which serves as the search server 436 of FIG. 4.

In steps 617 and 618, the Internet server 612a sends a request message for an access network, or source address, to an AN DB 611, and receives therefrom an access network response message indicating whether the network accessed by the subscriber station 600a supports a USI. To determine whether the network supports the USI, the Internet server 612a can send the request message using an IP address of the subscriber station (or terminal) 600a to the AN DB 611 (Case 1), or can send the request message using an IP address used in a firewall of the access network to the AN DB 611 (Case 2). In either case, the Internet server 612a can determine whether the network accessed by the subscriber station 600a supports the USI in association with the AN DB 611. If it is determined that the network accessed by the subscriber station 600a supports the USI, the Internet server 612a provides in step 619 a web portal page with a location-based search option box to the subscriber station 600a.

However, if the network accessed by the subscriber station 600a does not support the USI, the Internet server 612a provides in step 619 a web portal page with no location-based search option box, or an inactivated location-based search option box, to the subscriber station 600a.

Figure 6B:
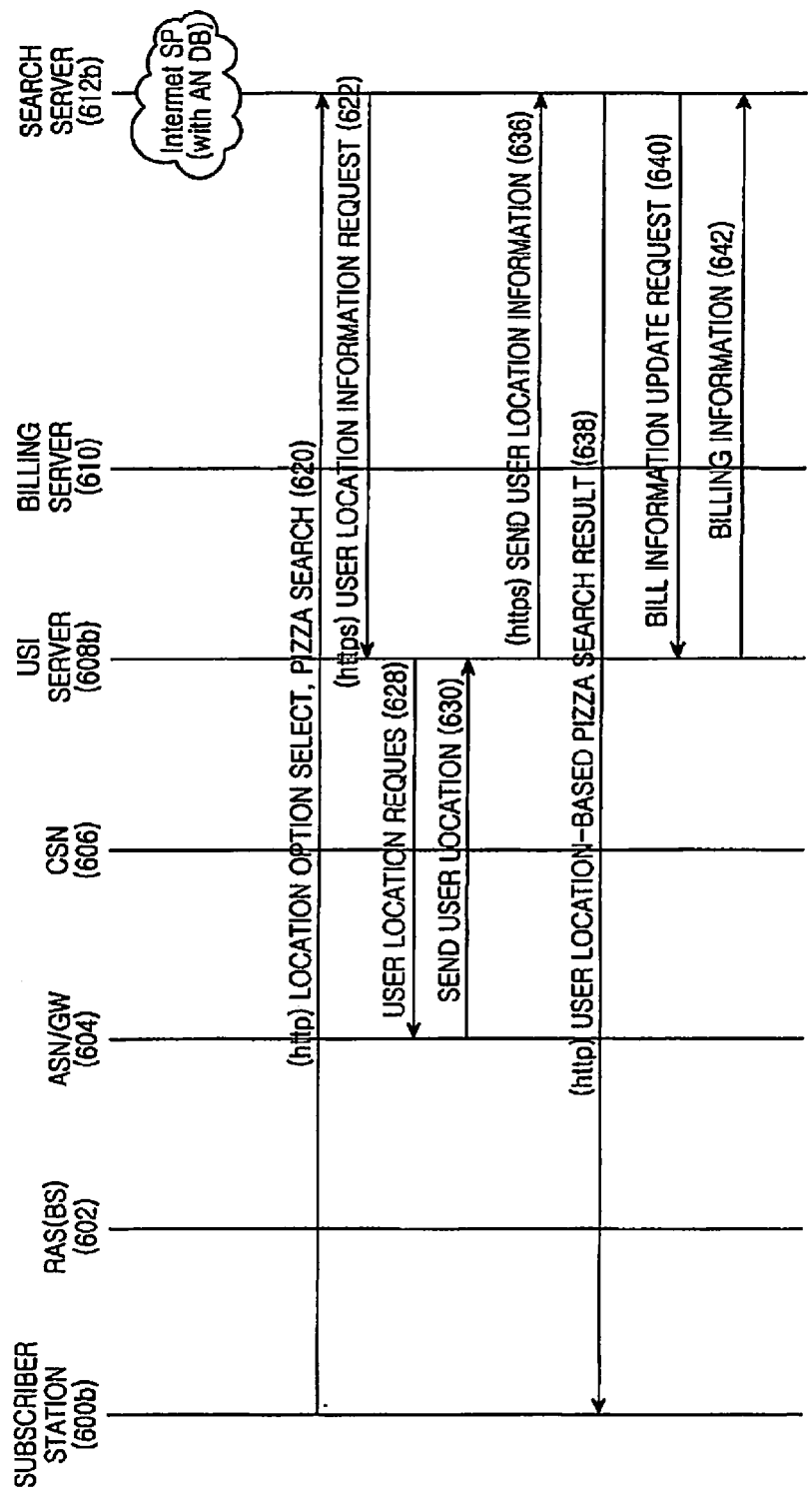

FIG. 6B illustrates a method for providing an Internet search service based on user's location information.

FIG. 6B includes a search server 612b of an Internet service provider for providing a search service, a subscriber station 600b in subscribing to the search service, an RAS 602, which is a base station of the cell where the subscriber station 600b is located, an ASN GW 604 for storing the last cell ID where the subscriber station 600b has last been located, a CSN 606 handling a connection with the subscriber station 600b and the network, a USI server 608b serving as a user interface between the subscriber station 600b and the search server 612b for the search service based on location information, and a billing server 610 for filling of the service used by the subscriber station 600b.

It will be assumed in FIGS. 6A to 10 that the network accessed by the subscriber stations 600b, 700, 800, 900 and 1000 uses the USI.

Referring to FIG. 6B, in step 620, the subscriber station 600b selects 'location information option', and sends a search request for particular information to the search server 612b of the Internet service provider. Upon receipt of the search request, the search server 612b sends a request for a location of the subscriber station 600b to the USI server 608b in step 622.

In step 628, the USI server 608b sends a request for location information of the subscriber station 600b to the ASN GW 604. In step 630, the ASN GW 604 sends the cell ID last accessed by the subscriber station 600b to the USI server 608b. In step 636, the USI server 608b forwards the last cell ID of the subscriber station 600b to the search server 612b.

Upon receipt of the last cell ID, the search server 612b makes in step 638 a search for requested particular information based on the last cell ID of the subscriber station 600b, and sends the search result to the subscriber station 600b. The search server 612b sends a billing information update request to the USI server 608b in step 640, and the USI server 608b sends the corresponding billing information to the search server 612b in step 642.

Because the last cell ID, or location information, of the subscriber station 600b is the service that the USI server 608b, or the communication system, has provided to the Internet service provider, the USI server 608b, upon receipt of a request for the billing information update from the Internet service provider, operates as follows, and then reports the result to the Internet service provider. Through steps 640 and 642, the USI server 608b records in the billing server 610 the information indicating that the location information of the subscriber station 600b was provided, and then receives a response thereto.

For example, in steps 622 to 636, 'https' is used for security, and Extensible Markup Language (XML) is utilized for structuring of the exchanged data. However, various alternatives are possible.

After a long time has elapsed from the instance when the last cell ID of the subscriber station 600b was recorded in the ASN GW 604, there is a possibility that the last cell ID of the subscriber station 600b will not be correct. Therefore, in a second embodiment of the present invention, when the communication system has no separate location information server and a long time has elapsed after the instance when the last cell ID of the subscriber station 600b was recorded in the ASN GW 604, the Internet service provider requests the corresponding terminal to re-perform paging. That is, during paging, the terminal performs the search service using, as location information of the terminal, the cell ID that the terminal accesses again at the current location.

Figure 7:
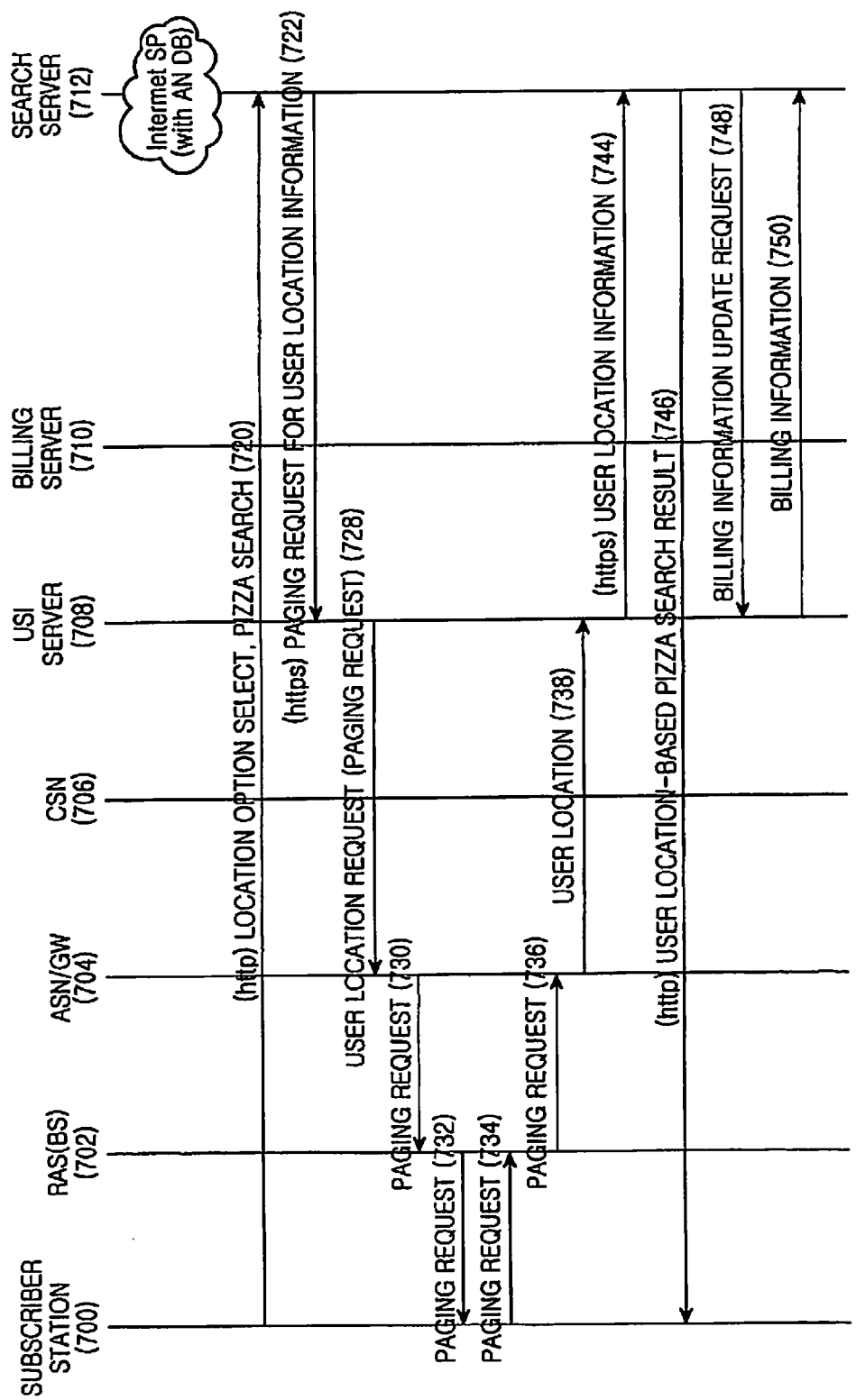
FIG. 7 illustrates a signaling flow of a search service according to a second embodiment of the present invention.

FIG. 7 illustrates a signaling flow of a search service according to the second embodiment of the present invention. It is assumed herein that a long time has elapsed after the time when the last cell ID of a subscriber station 700 was recorded in an ASN GW 704.

FIG. 7 includes a search server (or Internet server) 712 of an Internet service provider for providing a search service, a subscriber station 700 in subscribing to the search service, an RAS 702, which is a base station of the cell where the subscriber station 700 is located, an ASN GW 704 for storing the last cell ID of the subscriber station 700, a CSN 706 handling a connection with the network, a USI server 708 serving as a user interface between the subscriber station 700 and the search server 712 for the search service based on location information, and a billing server 710 for filling of the service used by the subscriber station 700.

In step 720, the subscriber station 700 selects 'location information option', and sends a search request for particular information to the search server 712 of the Internet service provider. In step 722, the search server 712 sends a paging request to the USI server 708 to acquire location information of the subscriber station 700.

In step 728, the USI server 708 sends a request for paging of the subscriber station 700 to the ASN GW 704. In steps 730 and 732, the ASN GW 704 sends a paging command to the subscriber station 700 via the RAS 702. In steps 734 and 736, the subscriber station 700 performs paging, and then sends its last cell ID to the ASN GW 704 via the RAS 702.

In step 738, the ASN GW 704 forwards the last cell ID to the USI server 708 as location information of the subscriber station 700. In step 744, the USI server 708 forwards the last cell ID of the subscriber station 700 acquired through the paging procedure to the search server 712. In step 746, the search server 712 performs a search using the last cell ID of the subscriber station 700, and delivers the search result to the subscriber station 700.

Because the last cell ID of the subscriber station 700 is the service that the USI server 708, or the network service provider, has provided to the Internet service provider, the USI server 708, upon receipt of a billing information update request from the Internet service provider, operates as follows, and then reports the result to the Internet service provider. The search server 712 sends a billing information update request to the USI server 708 in step 748, and the USI server 708 records in step 750 in the billing server 710 the information indicating that the location information was provided, and then transmits the corresponding billing information to the search server 712.

A third embodiment of the present invention provides a subscriber station with a Push service based on location information of the subscriber station. As to the location information of the subscriber station, when the network service provider has no separate location information server as in the second embodiment, it uses, as location information of a terminal, the cell ID that the terminal has accessed again, by sending a request for paging of the corresponding terminal. Thereafter, the Internet service provider sends a Push service to the subscriber station based on the location information of the terminal. Herein, the Push service corresponds to the services to which the subscriber station has not subscribed, i.e. such information as the event or advertisement happening in the location of the subscriber station. For example, the Internet service provider sends an advertisement indicating the event happening in, for example, the department stores in the Dallas area, for the user of the terminal located in the Dallas area.

Figure 8:
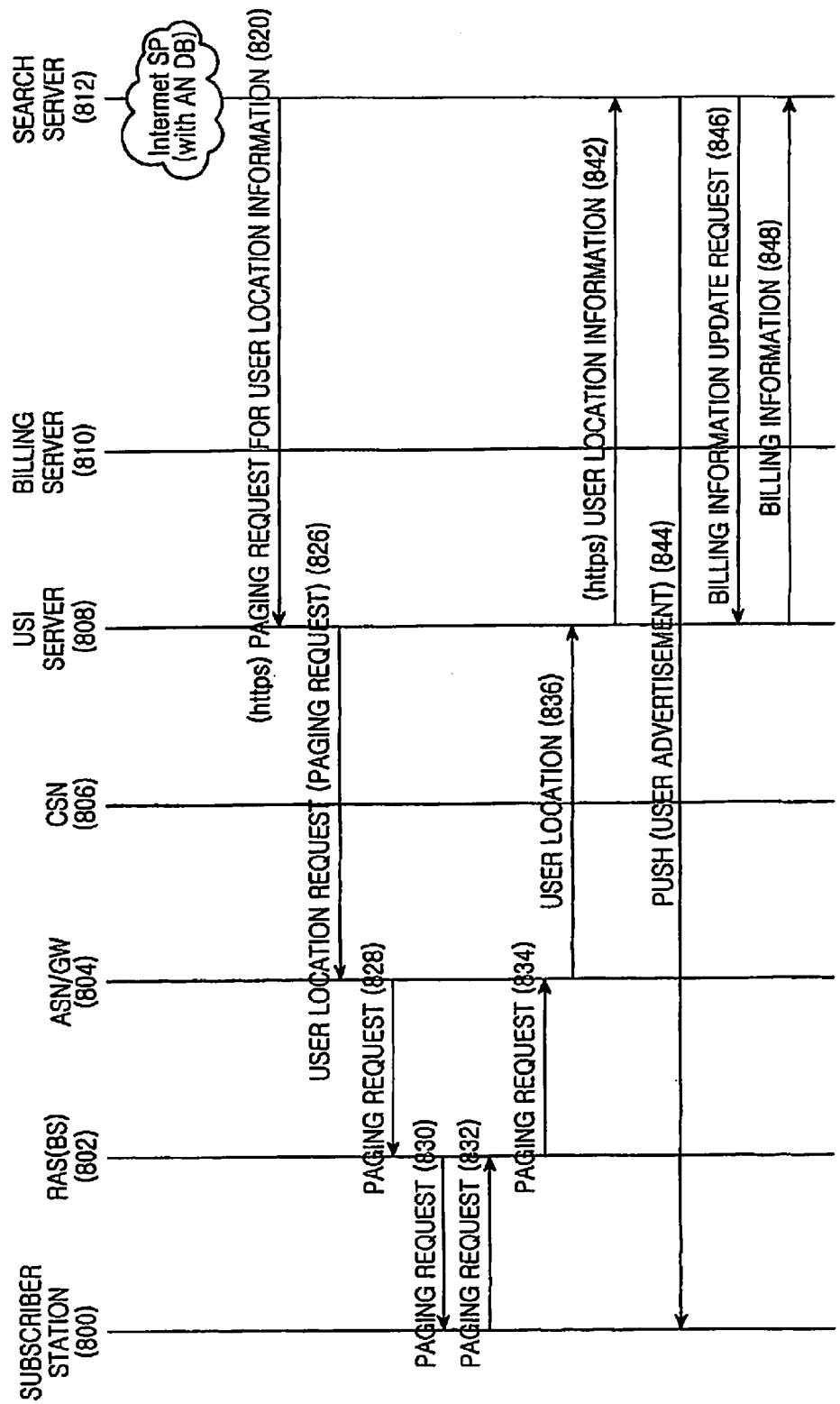
FIG. 8 illustrates a signaling flow of a Push service based on location information of a terminal according to a third embodiment of the present invention.

FIG. 8 illustrates a signaling flow of a Push service based on location information of a terminal according to the third embodiment of the present invention. It is assumed herein that an advertisement service is provided as an example of the Push service.

FIG. 8 includes an advertising server (or Internet server) 812 of an Internet service provider for providing an advertisement service, a subscriber station 800 in subscribing to the advertisement service, an RAS 802, which is a base station of the communication system (or cell) where subscriber station 800 is located, an ASN GW 804 for storing the last cell ID of the subscriber station 800, a CSN 806 handling a connection to the network, a USI server 808 handling interfacing between the subscriber station 800 and the search server 812 using network information of the user, and a billing server 810 for billing of the service used by the subscriber station 800.

In step 820, the search server 812 sends a paging request to the USI server 808 to acquire location information of the subscriber station 800. In step 826, the USI server 808 sends a request for paging of the subscriber station 800 to the ASN GW 804. In steps 828 and 830, the ASN GW 804 sends a paging command to the subscriber station 800 via the RAS 802. In steps 832 and 834, the subscriber station 800 performs paging, and then sends its last cell ID to the ASN GW 804 via the RAS 802. In step 836, the ASN GW 804 sends the last cell ID to the USI server 808 as location information of the subscriber station 800. In step 842, the USI server 808 sends the last cell ID to the search server 812.

Upon receipt of the last cell ID, the search server 812 delivers in step 844 the advertisement based on location information of the subscriber station 800, to the subscriber station 800.

Similarly to FIG. 7, because the last cell ID, or location information, of the subscriber station 800 is the service that the USI server 808, or the network service provider, provides to the Internet service provider, the USI server 808, upon receipt of a billing information update request from the Internet service provider, operates as follows, and then reports the result to the Internet service provider. The advertising server 812 sends a billing information update request to the USI server 808 in step 846, and the USI server 808 records in the billing server 810 the information indicating that the location information was provided, and then receives a response thereto. In step 848, the USI server 808 sends the corresponding billing information to the advertising server 812.

In a fourth embodiment of the present invention, when a communication system accessed by a subscriber station has a separate location information server, an Internet service provider acquires location information of the terminal by means of the location information server, and then provides a search service using the location information.

Figure 9:
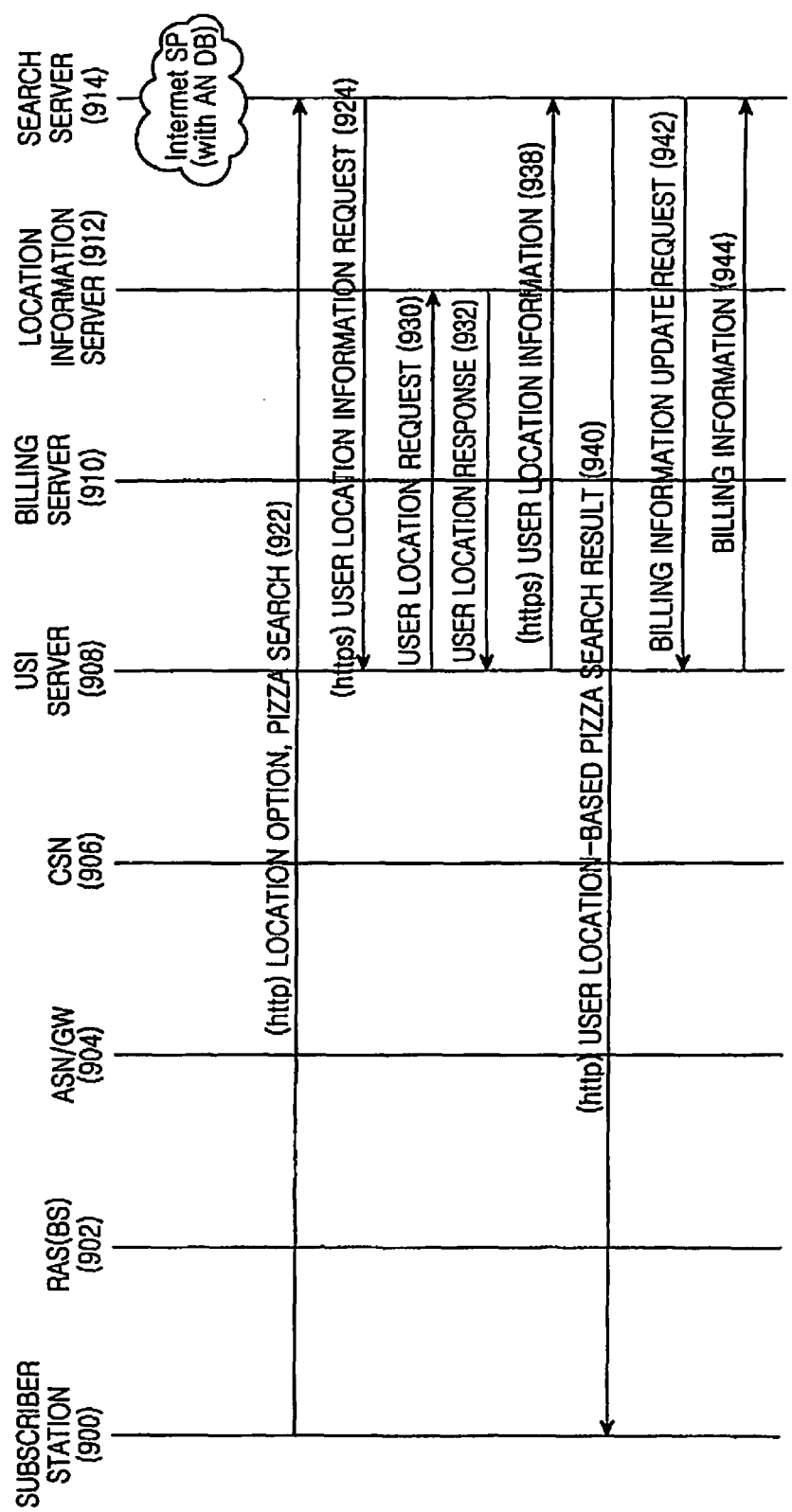
FIG. 9 illustrates a signaling flow of a search service according to a fourth embodiment of the present invention.

FIG. 9 illustrates a signaling flow of a search service according to the fourth embodiment of the present invention.

FIG. 9 includes a search server (or Internet server) 914 of an Internet service provider for providing a search service, a subscriber station 900 in subscribing to the search service, an RAS 902, which is a base station of the communication system (or cell) where the subscriber station 900 is located, an ASN GW 904 for storing an ID of the cell where the subscriber station 900 has last been located, a CSN 906 handling a connection with the network, a USI server 908 for interfacing between the subscriber station 900 and the search server 914 to acquire location information of the subscriber station 900, a billing server 910 for billing of the service used by the subscriber station 900, and a location information server 912 for storing location information of the subscriber station 900.

In step 922, the subscriber station 900 selects 'location information option', and sends a search request for its desired particular information to the search server 914 of the Internet service provider. Upon receipt of the search request, the search server 914 sends in step 924 a request for a location of the subscriber station 900 to the USI server 908. In step 930, the USI server 908 sends a request for location information of the subscriber station 900 to the location information server 912. In step 932, the location information server 912 searches for location information of the subscriber station 900, and sends it to the USI server 908. In step 938, the USI server 908 forwards the location information of the subscriber station 900 to the search server 914.

Upon receipt of the location information, the search server 914 performs in step 940 a search using the location information of the subscriber station 900, and delivers the search result to the subscriber station 900.

Similarly to FIG. 7, because the location information of the subscriber station 900 is the service that the USI server 908, or the network service provider, has provided to the Internet service provider, the USI server 908, upon receipt of a billing information update request from the Internet service provider, operates as follows, and then reports the result to the Internet service provider. The search server 914 sends a billing information update request to the USI server 908 in step 942, and the USI server 908 records in step 944 in the billing server 910 the information indicating that the location information was provided. In step 944, the USI server 908 sends the corresponding billing information to the search server 914.

It is assumed herein that in steps 924 and 938, 'https' is used for security and XML is used for structuring of the exchanged data.

In a fifth embodiment of the present invention, when a communication system has a separate location information server, an Internet service provider uses both of a first scheme of acquiring location information of a subscriber station by means of the location information server, and a second scheme of acquiring, as location information, a cell ID last accessed by paging of the subscriber station. Although the present invention herein provides a method for acquiring location information of the corresponding terminal using both of the two schemes, by way of example, the second scheme out of the two schemes can be optionally used. Thereafter, the Internet service provider selects, as location information of the terminal, the more detailed and correct value in the location information acquired through the two schemes, and provides a Push service based thereon. When selecting paging, the fifth embodiment can further reduce a delay time of the Push service.

Specifically, the Internet service provider acquires location information of the corresponding terminal from the location information server by means of the first scheme. Although the Internet service provider has the acquired location information, if the Internet service provider optionally selects the second scheme, it sends a paging request to the corresponding terminal and receives a cell ID during re-access of the terminal. Thereafter, the Internet service provider compares the location information acquired from the location information server with the last cell ID obtained by the paging, and selects, as location information of the terminal, the last location information or the more detailed and correct value, thereby selecting more correct location information. Therefore, the Internet service provider can reduce the delay time occurring when providing the Push-type service to the corresponding terminal. It will be assumed herein that advertisement is provided as an example of the Push-type service.

Figure 10:
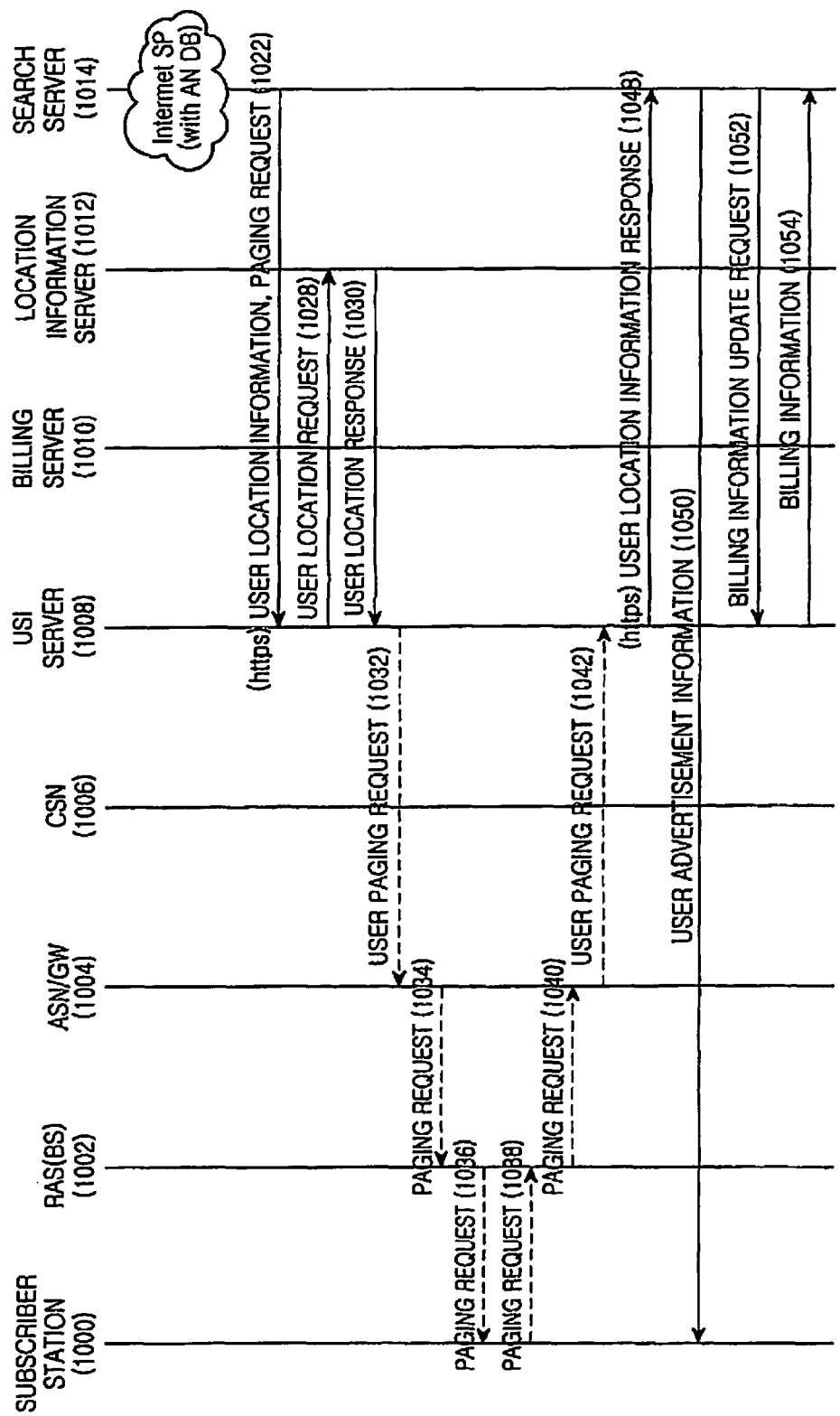
FIG. 10 illustrates a signaling flow of an advertisement service according to a fifth embodiment of the present invention.

FIG. 10 illustrates a signaling flow of an advertisement service according to a fifth embodiment of the present invention.

FIG. 10 includes an advertising server (or Internet server) 1014 of an Internet service provider for providing a search service, a subscriber station 1000 in subscribing to the search service, an RAS 1002, which is a base station of the communication system (or cell) where the subscriber station (or terminal) 1000 is located, an ASN GW 1004 for storing the last cell ID of the subscriber station 1000, a CSN 1006 handling a connection with the network, a USI server 1008 for interfacing between the subscriber station 1000 and the search server 1014 using network information of the user, a billing server 1010 for billing of the service used by the subscriber station 1000, and a location information server 1012 for storing location information of the subscriber station 1000.

To reduce the time delay while providing the advertisement service, the Internet service provider herein uses both of a method for acquiring location information of the corresponding terminal by paging, and a method for acquiring location information of the corresponding terminal by means of the location information server 1012.

In step 1022, the search server 1014 sends a request for both of location information of the subscriber station 1000, provided from the location information server 1012, and the last cell ID acquired by paging, to the USI server 1008.

In step 1028, the USI server 1008 sends a request for location information of the subscriber station 1000 to the location information server 1012. In step 1030, the location information server 1012 searches for the location information of the subscriber station 1000, stored therein, and sends the searched location information to the USI server 1008. Because the Internet service provider has optionally selected in step 1022 a method of receiving location information of the subscriber station 1000 by paging, the USI server 1008 sends a request for paging of the subscriber station 1000 to the subscriber station 1000 via the ASN GW 1004 and the RAS 1002 in steps 1032 to 1036. In steps 1038 to 1042, the subscriber station 1000, upon receipt of the paging request, performs paging and sends its last accessed cell ID last to the USI server 1008 via the RAS 1002 and the ASN GW 1004. If the method of acquiring location information by paging has not been selected, steps 1032 to 1042 are skipped.

In step 1048, the USI server 1008 forwards the location information of the subscriber station 1000 to the search server 1014. Upon receipt of the location information, the search server 1014 delivers in step 1050 an advertisement based on the location information of the subscriber station 1000 to the subscriber station 1000.

Similarly to FIG. 7, because the location information of the subscriber station 1000 is the service that the USE server 1008, or the network service provider, has provided to the Internet service provider, the USI server 1008, upon receipt of a billing information update request from the Internet service provider, operates as follows and then reports the result to the Internet service provider. In step 1052, the search server 1014 sends a billing information update request to the USI server 1008. In step 1054, the USI server 1008 records in the billing server 1010 the information indicating that the location information of the subscriber station 1000 was provided, and then sends the corresponding billing information to the search server 1014.

Figure 11:
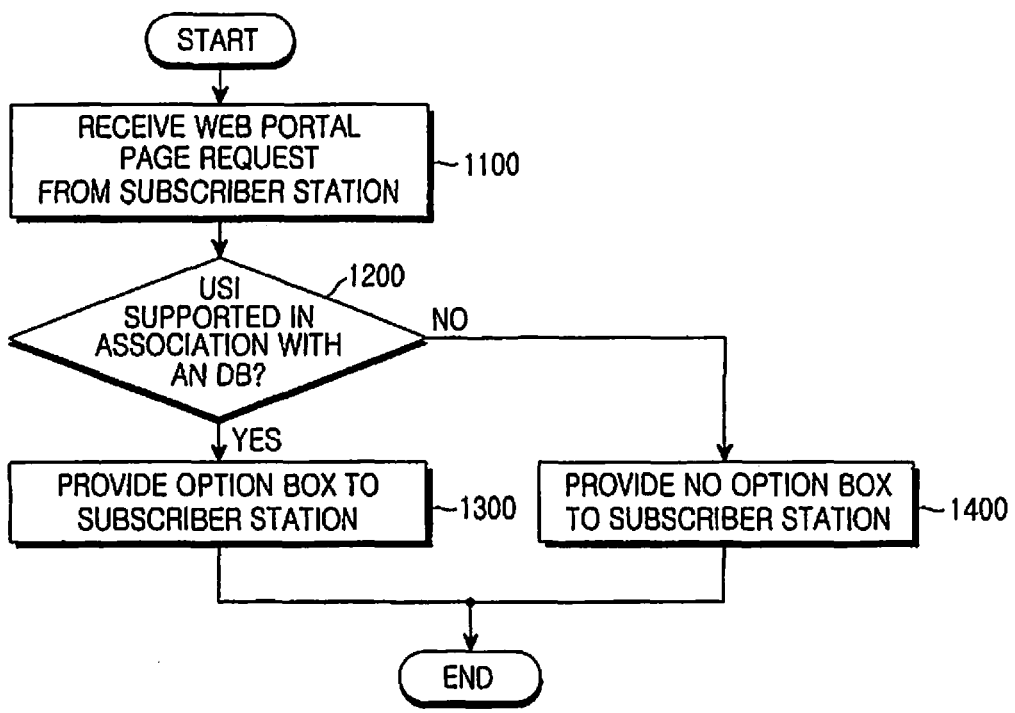
FIG. 11 illustrates a flowchart for providing a location-based Internet service by an Internet server according to the present invention.

FIG. 11 illustrates a flowchart for providing a location-based Internet service by an Internet server according to a sixth embodiment of the present invention.

Referring to FIG. 11, in step 1100, the Internet server receives a request for a web portal page from a subscriber station, and then proceeds to step 1200.

In step 1200, the Internet server determines whether a network accessed by the subscriber station supports a USI in association with an AN DB. If it is determined that the network accessed by the subscriber station can support the USI, the Internet server proceeds to step 1300, and if the network accessed by the subscriber station cannot support the USI, the Internet server proceeds to step 1400.

In step 1300, the Internet server provides the subscriber station with a web portal page including an option box by which the subscriber station can perform a location-based search service. In step 1400, the Internet server provides the subscriber station with a web portal page having no option box by which the location-based search service is possible, or with an inactivated web portal page.

As can be understood from the foregoing description, according to the present invention, the Internet service provider can provide high value-added services using user's location information in the mobile network service provider by means of the USI access network of the subscriber station, and the mobile network service provider can sell the user's location information to the Internet service provider as a new service. As a result, the high value-added services provided by the Internet service provider may promote use of the USI-supported mobile communication network by the common users.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for providing an internet service by a server, the method comprising:
   receiving, from a subscriber station, a search request including a keyword for searching;
   searching information corresponding to the search request based on location information related to the subscriber station, wherein the location information is acquired by analyzing information of a cell at which the subscriber station is located in a mobile communication system;
   transmitting the searched information to the subscriber station; and
   if a reference time has elapsed after generating the information of the cell, updating the location information.

2. The method of claim 1, wherein the information of the cell is an identifier (ID) of the cell.

3. The method of claim 2, wherein the cell is a cell accessed by the subscriber station during a paging procedure of the subscriber station.

4. The method of claim 3, wherein the updated location information is obtained during a paging procedure of the subscriber station.

5. The method of claim 4, wherein the paging procedure is performed in response to a paging request by the server.

6. An apparatus for providing an internet service, the apparatus comprising:
   a transceiver configured to transmit and receive a signal; and
   a controller configured to receive, from a subscriber station, a search request including a keyword for searching, search information corresponding to the search request based on location information related to the subscriber station, wherein the location information is acquired by analyzing information of a cell at which the subscriber station is located in a mobile communication system, and is configured to update the location information, if a reference time has elapsed after generating the information of the cell, and
   the transceiver further configured to transmit the searched information to the subscriber station.

7. The apparatus of claim 6, wherein the information of the cell is an identifier (ID) of the cell.

8. The apparatus of claim 7, wherein the cell is a cell accessed by the subscriber station during a paging procedure of the subscriber station.

9. The apparatus of claim 8, wherein the updated location information is obtained during a paging procedure of the subscriber station.

10. The apparatus of claim 9, wherein the paging procedure is performed in response to a paging request by the server.

11. A method for using an internet service by a subscriber station, the method comprising:
    transmitting, to a server, a search request including a keyword for searching;
    receiving, from the server, searched information corresponding to the search request based on location information related to the subscriber station, wherein the location information is acquired by analyzing information of a cell at which the subscriber station is located in a mobile communication system, and
    updating, if a reference time has elapsed after generating the information of the cell, the location information.

12. The method of claim 11, wherein the information of the cell is an identifier (ID) of the cell.

13. The method of claim 12, wherein the cell is a cell accessed by the subscriber station during a paging procedure of the subscriber station.

14. The method of claim 13, wherein the updated location information is obtained during a paging procedure of the subscriber station.

15. The method of claim 14, wherein the paging procedure is performed in response to a paging request by the server.

16. An apparatus for using an internet service, the apparatus comprising:
    a transceiver for transmitting and receiving a signal; and
    a controller configured to transmit, to a server, a search request including a keyword for searching and receive from the server, searched information corresponding to the search request based on location information related to the subscriber station, wherein the location information acquired by analyzing information of a cell at which the subscriber station is located in a mobile communication system,
    wherein the location information is updated if a reference time has elapsed after generating the information of the cell.

17. The apparatus of claim 16, wherein the cell is an identifier (ID) of the cell.

18. The apparatus of claim 17, wherein the cell is a cell accessed by the subscriber station during a paging procedure of the subscriber station.

19. The apparatus of claim 18, wherein the updated location information is obtained during a paging procedure of the subscriber station.

20. The apparatus of claim 19, wherein the paging procedure is performed in response to a paging request by the server.

* * * * *